United States Patent [19]
Holzer et al.

[11] Patent Number: 5,820,761
[45] Date of Patent: *Oct. 13, 1998

[54] PROCESS FOR THE TREATMENT OF ORGANIC POLLUTANTS IN WASTEWATERS BY WET OXIDATION

[75] Inventors: Klaus Holzer; Otto Horak, both of Leverkusen; Thomas Melin, Köln, all of Germany

[73] Assignee: Bayer Aktiengesellschaft, Leverkusen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 666,528
[22] PCT Filed: Dec. 23, 1994
[86] PCT No.: PCT/EP94/04301
  § 371 Date: Jul. 1, 1996
  § 102(e) Date: Jul. 1, 1996
[87] PCT Pub. No.: WO95/18769
  PCT Pub. Date: Jul. 13, 1995

[30] Foreign Application Priority Data

Jan. 7, 1994 [DE] Germany .................. 44 00 243.2

[51] Int. Cl.⁶ ................................................. C02F 3/12
[52] U.S. Cl. .................. 210/631; 210/750; 210/762; 210/903; 423/235
[58] Field of Search ................... 210/631, 750, 210/761, 762, 903; 423/235

[56] References Cited

U.S. PATENT DOCUMENTS 3,649,534  3/1972  Schotte .
3,876,536  4/1975  Pradt et al. .
4,765,900  8/1988  Schwoyer et al. .
4,981,659  1/1991  Chuang et al. .......................... 423/235
5,051,191  9/1991  Rasmussen et al. ..................... 210/758
5,252,224  10/1993  Modell et al. .......................... 210/761
5,470,481  11/1995  Modell et al. .......................... 210/652
5,527,466  6/1996  Li et al. ................................. 210/652

FOREIGN PATENT DOCUMENTS 0284754  10/1988  European Pat. Off. .
0413356  2/1991  European Pat. Off. .
3296500  12/1991  Japan .
0724482  1/1995  Japan .

OTHER PUBLICATIONS

Chemical Abstracts, vol. 117, abstract No. 257457e, p. 395 (1992).

Chemical Abstracts, vol. 114, abstract No. 191865, p. 396 (1991).

Primary Examiner—Jay H. Woo
Assistant Examiner—Betsey J. Morrison
Attorney, Agent, or Firm—Sprung Kramer Schaefer & Briscoe

[57] ABSTRACT

Organic pollutants in wastewaters are wet-oxidized by addition of pure oxygen or an oxygen-containing gas at temperatures of 80° to 330° C., under pressures of 1 bar to 200 bar and at a pH value below 7. For the wet oxidation process, iron ions and digested sludge or surplus sludge from a biological sewage treatment plant are added to the wastewater.

8 Claims, 1 Drawing Sheet

PROCESS FOR THE TREATMENT OF ORGANIC POLLUTANTS IN WASTEWATERS BY WET OXIDATION

This invention relates to a process for the degradation of organic pollutants in wastewaters by wet oxidation in which pure oxygen or an oxygen-containing gas is added at temperatures of 80° to 330° C. and under pressures of 1 bar to 200 bar.

To reduce the temperatures (and hence the pressures) required for oxidation, it has already been proposed to treat the organically polluted wastewaters with oxygen or oxygen-containing gases at a redox potential of 300 to 600 mV, the redox potential being adjusted by addition of redox systems, preferably $Fe^{++}$ or $Fe^{+++}$ ions. It is possible in this way to reduce the reaction temperature to well below 250° C. It is also known that the reaction temperature can be further reduced by adding benzoquinones or naphthoquinones as co-catalysts to the wastewater during the wet oxidation process. This process is described in DE 33 16 265 and in the Article by O. Horak in Chem. Ing. Techn. 62 (1990), No. 7, pages 555–557.

It has now been found that treated sludge can be used as co-catalyst instead of the quinones mentioned in DE 33 16 265. The treated sludge may be either surplus sludge from an industrial sewage treatment plant or digested sludge from a communal sewage treatment plant. There is thus no longer any need for the expensive quinoidal chemicals or for the elaborate pretreatment measures described in DE 33 16 265. At the same time, a large part of the biological surplus sludge can be oxidatively eliminated in this way.

Accordingly, the present invention relates to a process for the degradation of organic pollutants in wastewaters by wet oxidation in which pure oxygen or an oxygen-containing gas is added at temperatures of 80° to 330° C. and preferably 120° to 200° C., under a pressure of 1 bar to 200 bar and preferably 3 bar to 50 bar and at a pH value below 7 and preferably below 4, characterized in that the wet-oxidative degradation is carried out in the presence of iron and digested sludge or surplus sludge from a biological sewage treatment plant.

The digested sludge or the surplus sludge is preferably added to the wastewater in a quantity of 1 g to 150 g and more preferably in a quantity of 3 g to 30 g sludge dry matter per liter of wastewater.

After the wet oxidation, the acidic wastewater is best neutralized or alkalized by addition of alkali.

Another embodiment of the invention is characterized in that the basic wastewater is passed through a stripping column to remove the ammonium formed during the wet oxidation of organic nitrogen compounds and to recover it in the form of ammonia solution. The ammonia solution recovered may then advantageously be used as reducing agent in the catalytic removal of nitrogen oxides from waste gases.

Heavy metal hydroxides may be precipitated during the alkalization of the acidic wastewater coming from the wet oxidation process. They are best filtered off in a separate step and separately disposed of. The basic wastewater freed from heavy metal hydroxides is then advantageously delivered to a biological sewage treatment plant.

A further improvement is obtained by delivering the wastewater free from the ammonium to the denitrification stage of a biological sewage treatment plant.

The following advantages are afforded by the invention:
  There is no need for the addition of expensive quinoidal chemicals or for the expensive production of quinones in a preliminary stage of the wastewater treatment.
  At the same time, the problematical treated sludge can be inexpensively eliminated.
  The ammonia formed during the oxidation can readily be recovered and reused.

BRIEF DESCRIPTION OF THE DRAWING

The FIGURE is a flowchart showing the process of the invention.

The invention is described in more detail in the following with the aid of Comparison Examples and a flow chart.

Figure 1:
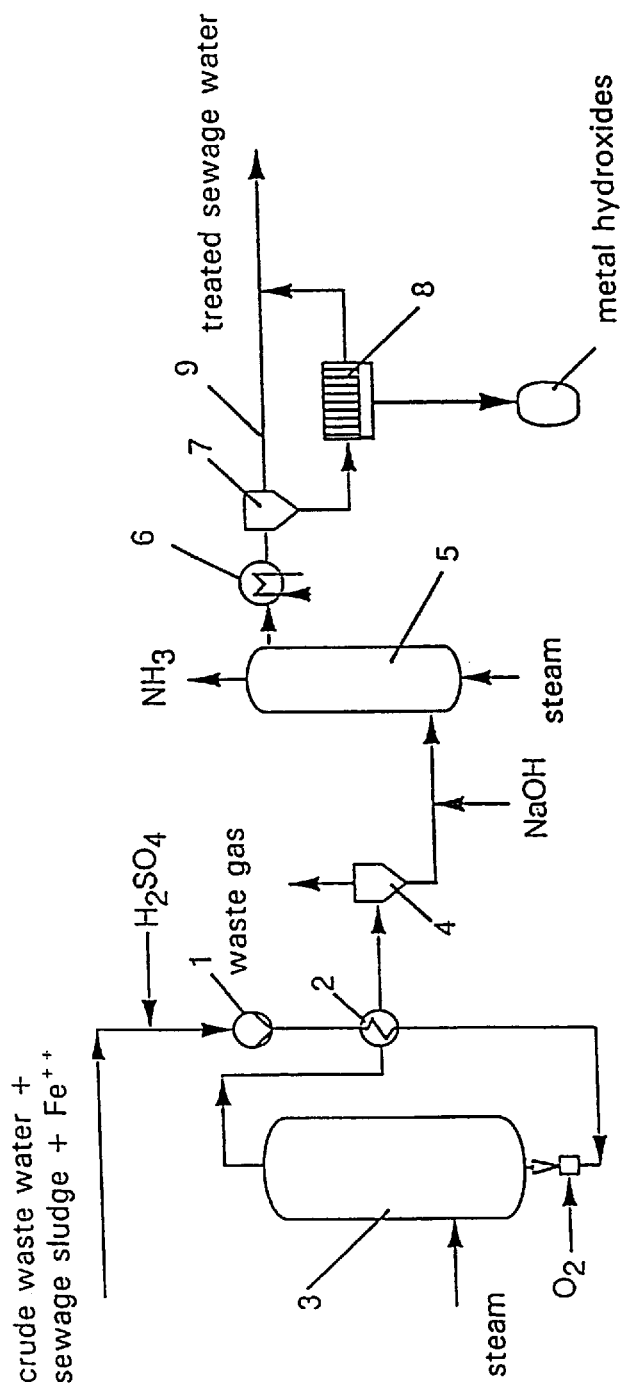

Treated sludge with a concentration of around 10 to 20 g dry matter per liter wastewater and iron ions in the form of iron salts with a concentration of around 0.3 to 0.5 g $Fe^{++}$/l are added to an untreated wastewater with a COD content of 1 to 200 g/l and the mixture is acidified with $H_2SO_4$ to a pH value of 1.5 to 2. The acidic wastewater sludge mixture is brought by a pump 1 to a process pressure of around 20 bar, heated in a countercurrent heat exchanger 2 and then introduced into the oxidation reactor 3. The oxidation reactor 3 is a bubble column into which pure oxygen is introduced in the form of fine bubbles through injectors at the base of the column. The oxidation reaction preferably takes place at temperatures of 120° to 220° C. over a residence time of 1 to 3 hours. The organic pollutants in the wastewater are oxidized to $CO_2$ and water. The oxidation reactor 3 is started up by preheating with steam. The process then continues auto-thermally.

The treated wastewater flows from the head of the oxidation reactor 3 to the countercurrent heat exchanger 2 where it is cooled to around 100° C. Gaseous components are then separated from the wastewater in a cyclone separator 4 and relieved of pressure. A small quantity of waste gas containing CO in addition to $CO_2$ is formed and can be aftertreated in known manner.

During the wet oxidation process in the reactor 3, organic nitrogen compounds are converted into ammonium. If the wastewater issuing from the separator 4 is alkalized by addition of alkali, for example NaOH, the ammonium can be removed from the wastewater in the form of ammonia in a following stripping column 5. The ammonia recovered may advantageously be used as reducing agent in the catalytic removal of nitrogen oxides from waste gases.

During the wet oxidation process in the reactor 3, any heavy metals present in the wastewater also pass into solution. They are converted into hydroxides during the alkalization step and, after cooling in the heat exchanger 6, may be separated as solids in a sedimentation vessel 7. The solid separated off may then be freed from water in a filter press 8. The dewatered metal hydroxides are then separately disposed of while the liquid phase is returned to the wastewater pipe 9. The treated wastewater freed from ammonium and heavy metal compounds still contains organic fragments which are readily biodegradable. For this reason, the wastewater line 9 is connected to a conventional biological sewage treatment plant where the wastewater can be directly introduced into a denitrification stage optionally present.

EXAMPLE 1 (PRIOR ART)

A mixed wastewater with a total COD (chemical oxygen demand) value of 52.5 g/l and an AOX content of 17 mg/l was oxidized with oxygen in an autoclave for 3 hours at 190° C./18 bar. The COD value of 52.5 applied to the solids-containing untreated wastewater. After removal of the solids by filtration, the COD value was 48.4. Both values are entered in column 2 of Table 1. In this Example, only iron ions were added in a concentration of 0.3 g/l. The result was a COD reduction to 32.0 g/l (39%) and a reduction in AOX (adsorbed organic halogen compounds) to 3 mg/l (82%). These values are shown in column 3 of Table 1.

EXAMPLE 2 (PRIOR ART)

Using the same untreated wastewater with a COD value of 52.5 g/l, quinones were added as co-catalysts in addition to the iron ions and the wet oxidation was then carried out under the same conditions as in Example 1. The quinones were obtained as in DE 33 16 265 by direct introduction of 5 g/l of lignite dust into the heated alkaline untreated wastewater. The wastewater was then acidified with $H_2SO_4$ and oxidized with oxygen. The COD value of the wastewater was reduced to 21.0 g/l (60%) by this treatment. The AOX content was reduced to 2 mg/l. These values are shown in column 3 of Table 1.

EXAMPLE 3 (INVENTION)

In a first test, treated sludge from the digestion tower of a communal sewage treatment plant with a concentration of 6 g dry matter per liter wastewater (DM/l) and, in a second test, treated sludge from the same source with a concentration of 12 g DM/l wastewater was added to the iron-containing mixed wastewater of Example 1. The sludge dry matter had a percentage organic component of around 50%. The wet oxidation was again carried out under the same conditions as described in Example 1.

As the results set out in columns 5 and 6 of the Table show, the COD value was reduced to 23.3 g/l (56%) and to 20.7 g/l (60.5%) by the catalytic effect of adding treated sludge. The oxidation result obtained was thus the same as that obtained by adding quinone catalysts in accordance with Example 2. The small differences in COD between unfiltered and filtered samples in the second test (20.7 g/l and 20.5 g/l) show that the organic sludge component is almost completely oxidized.

Wet oxidation of a wastewater mixture by the LOPROX process
($T = 190°$ C., $p = 18$ bar, $t_v = 3$ h, $C_{Fe}^{2+} = 0.3$ g/l)

| Analysis parameter | Untreated wastewater | Example 1 Fe | Example 2 Fe/quinones | Example 3 Fe/treated sludge | |
|---|---|---|---|---|---|
| | | | | 6 g DM/l | 12 g DM/l |
| COD [q $O_2$/l] | 52.5/ 48.4 | 32.0/26.7 | 21.0/ 19.8 | 23.3/21.2 | 20.7/20.5 |
| $BOD_5$ [g $O_2$/l] | 18.8 | 14.2 | 10.4 | 11.7 | 12.1 |

-continued

Wet oxidation of a wastewater mixture by the LOPROX process
($T = 190°$ C., $p = 18$ bar, $t_v = 3$ h, $C_{Fe}^{2+} = 0.3$ g/l)

| Analysis parameter | Untreated wastewater | Example 1 Fe | Example 2 Fe/quinones | Example 3 Fe/treated sludge | |
|---|---|---|---|---|---|
| | | | | 6 g DM/l | 12 g DM/l |
| TOC [g C/l] | 12.2 | 10.2 | 7.4 | 9.4 | 9.1 |
| $Cl^-$ [g/l] | 5.0 | 1.7 | 1.6 | 1.6 | 1.6 |
| AOX [mg/l] | 17 | 3 | 2 | 3 | 3 |
| pH | 8.3 | 1.7 | 2.1 | 2.0 | 2.1 |

We claim:

1. A single-oxidation process for the degradation of organic pollutants in waste water wherein said organic pollutants are oxidized by the addition of oxygen or an oxygen containing gas to said waste water at a temperature of 80°–330° C., a pressure of 3 bar to 50 bar and a pH of less than 7 in the presence of iron ions and surplus sludge or digested sludge from an industrial or municipal sewage treatment plant.

2. A process according to claim 1, wherein the digested sludge or surplus sludge is added to the wastewater in the presence of the iron ions in a quantity of 1 to 150 g sludge dry matter per liter wastewater.

3. A process as claimed in claim 1, characterized in that, after the wet oxidation, the acidic wastewater is neutralized or alkalized by addition of alkali.

4. A process according to claim 3, wherein the basic wastewater is passed through a stripping column to remove ammonium, which is formed during the wet oxidation of organic nitrogen compounds, and recover it as an ammonia solution.

5. A process as claimed in claim 4, characterized in that the ammonia solution recovered is reused as reducing agent in the catalytic removal of nitrogen oxides from waste gases.

6. A process according to claim 3, wherein heavy metal oxides, which are precipitated as a result of the addition of the alkali after the wet oxidation in the wastewater, are filtered off and separately disposed of.

7. A process as claimed in claim 3, characterized in that the neutralized or basic wastewater is fed to a biological sewage treatment plant.

8. A process as claimed in claim 4, characterized in that the wastewater freed from the ammonium is introduced into the denitrification stage of a biological sewage treatment plant.

\* \* \* \* \*